United States Patent [19]
Alberico

[11] Patent Number: 5,730,180
[45] Date of Patent: Mar. 24, 1998

[54] POSITIONING MEMBER FOR A CURB STOP BOX

[76] Inventor: Wayne R. Alberico, 3826 Buck Ave., Joliet, Ill. 60431

[21] Appl. No.: 699,512

[22] Filed: Aug. 19, 1996

[51] Int. Cl.⁶ ............................................. F16K 27/00
[52] U.S. Cl. ................................. 137/367; 137/368
[58] Field of Search .............................. 137/363, 367, 137/365, 368

[56] References Cited

U.S. PATENT DOCUMENTS

| 514,633 | 2/1894 | Sund | 137/365 |
| 604,622 | 5/1898 | Lobdell et al. | 137/365 |
| 820,616 | 5/1906 | Batt | 137/365 |
| 1,217,814 | 2/1917 | Parker | 137/365 |
| 2,099,479 | 11/1937 | Heinkel et al. | 137/367 |
| 4,308,886 | 1/1982 | Hondley et al. | 137/365 |

*Primary Examiner*—A. Michael Chambers
*Attorney, Agent, or Firm*—Ernest Kettelson

[57] ABSTRACT

A positioning member for a curb stop box which extends into the ground over an underground valve to hold the passageway through the curb stop box in alignment with the operating member of the underground valve so a tool can be extended down into the stop box passageway for turning the valve on and off. The positioning member comprises a cylindrical sleeve made of a durable rigid plastic material, having securing means such as internal threads to engage external threads on the neck of the valve body. The outer diameter of the cylindrical sleeve corresponds to the inner diameter of the facing portion of the curb stop box passageway when in position over the underground valve.

11 Claims, 4 Drawing Sheets

5,730,180

1

POSITIONING MEMBER FOR A CURB STOP BOX

BACKGROUND OF THE INVENTION

This invention relates to a positioning member for a curb stop box extending into the ground to hold its passageway from coming out of alignment with the operating handle of an underground valve. Such boxes are used to enable a workman to turn such underground valve off and on by extending a tool down through the passageway of the box to engage and turn the operating valve handle. Such boxes can be moved out of alignment with the operating handle of the valve as a result of nearby excavation or other construction activity and the like. In such case, the underground valve has to be dug out to gain access for turning it off and on. The positioning member of this invention holds the box from becoming displaced and moved out of alignment with the valve operating member.

PRIOR ART

Prior art of which the inventor is aware includes the devices disclosed in the following United States patents.

U.S. Pat. No. 4,819,687 discloses a valve box stabilizer which comprises a cylindrical member having radially extending fins spaced apart and extending outwardly from its side wall to make spaced apart contact with portions of the inner surface of the tubular box which covers the underground valve, the cylindrical member being seated over the neck of the valve with portions of the inner surface of the cylindrical member facing or in contact with the valve neck.

U.S. Pat. No. 4,691,733 discloses an undercover valve cover assembly and valve support for covering a buried valve for a section of pipe and for obtaining access to open and close the valve.

U.S. Pat. No. 4,572,236 discloses a valve stabilizing cradle for an underground curb cock positioned at the bottom of a vertical curb box passageway. The device embraces the curb cock to prevent its movement and keep its valve stem in the upright position for engagement by a long stem operating key.

U.S. Pat. No. 4,556,081 discloses a butterfly valve adaptor, comprising an adaptor for supporting a key box on the valve actuator for an underground water main butterfly valve, comprising a mounting plate having guides arranged to align the base of the key box on the valve actuator and a stabilizing plate connected to the mounting plate, spaced apart therefrom, and adapted to be positioned below the butterfly to prevent tipping of the mounting plate.

U.S. Pat. No. 3,658,086 discloses a valve control system which includes a housing over an underground valve in alignment with the valve control handle, and a tool that can be inserted through the passageway of the housing, such tool having cooperative guiding means to facilitate engagement with the valve operating member to open and close the valve.

U.S. Pat. No. 2,184,516 discloses an underground valve and a tool that is more easily guided into engagement with the valve operating handle, and which can also tighten the valve packing to stop leaks.

U.S. Pat. No. 1,785,475 discloses a shut off valve for underground water lines comprising a T-coupling having an upper and lower vertical run, above and below a lateral run, the lower run connected to a water supply line, the lateral run to the house or building being supplied with water, and the upper vertical run connected to a tubular extension through which a tool or key can be inserted to operate a valve mechanism therein.

U.S. Pat. No. 1,759,221 discloses a shut off cock for an underground valve.

U.S. Pat. No. 1,170,138 discloses a hydrant wrench having an outwardly flared open end.

SUMMARY OF THE INVENTION

The positioning member for a curb stop box covering an underground valve in accordance with this invention is an improvement over other devices known to the prior art. It comprises a cylindrical sleeve having an inner surface portion with internal threads of a desired pre-selected dimension for threaded engagement with the external threads of the neck of an underground valve surrounding the valve operating handle, and an outer surface of the cylindrical sleeve of the desired pre-selected diameter for a snug frictional fit in the bore or passageway of the curb stop box which leads from the valve up to ground level, and through which an elongated tool can be extended to engage and rotate the valve operating handle when necessary to open and close the valve.

The relative positioning and spacing of the outer surface of the cylindrical sleeve for the desired snug frictional fit with the curb stop box and the internal threads facing inwardly of the sleeve having the proper dimension to engage the external threads of the valve neck is accomplished by providing an annular shoulder projecting radially inward from the inner surface of the cylindrical sleeve having a shoulder wall facing inwardly on which the internal threads are formed. The annular shoulder can be made to extend inwardly any selected distance needed for use with whatever size curb stop box and whatever size threads the valve neck has for which a positioning member in accordance with this invention is to be used.

Such construction of the positioning member holds the curb stop box from longitudinal as well as lateral movement relative to the underground valve assembly, and threaded engagement of the positioning member with the valve assembly hold the positioning member itself from both lateral and longitudinal movement relative to the valve assembly.

By holding the curb stop box more securely in alignment with the valve operating handle of the valve assembly, it does not become displaced as easily from such events as excavating in the vicinity of the box and valve. If and when the box is knocked or pushed out of alignment with the valve operating handle, it then becomes necessary to dig down to the valve to shut it off and to turn it on. The positioning member in accordance with the present invention minimizes the risk of the box being moved out of alignment with the valve operator. The likelihood that an underground valve and box using a positioning member in accordance with this invention will have to be dug out is significantly reduced.

DESCRIPTION OF PREFERRED EMBODIMENT

Figure 1:
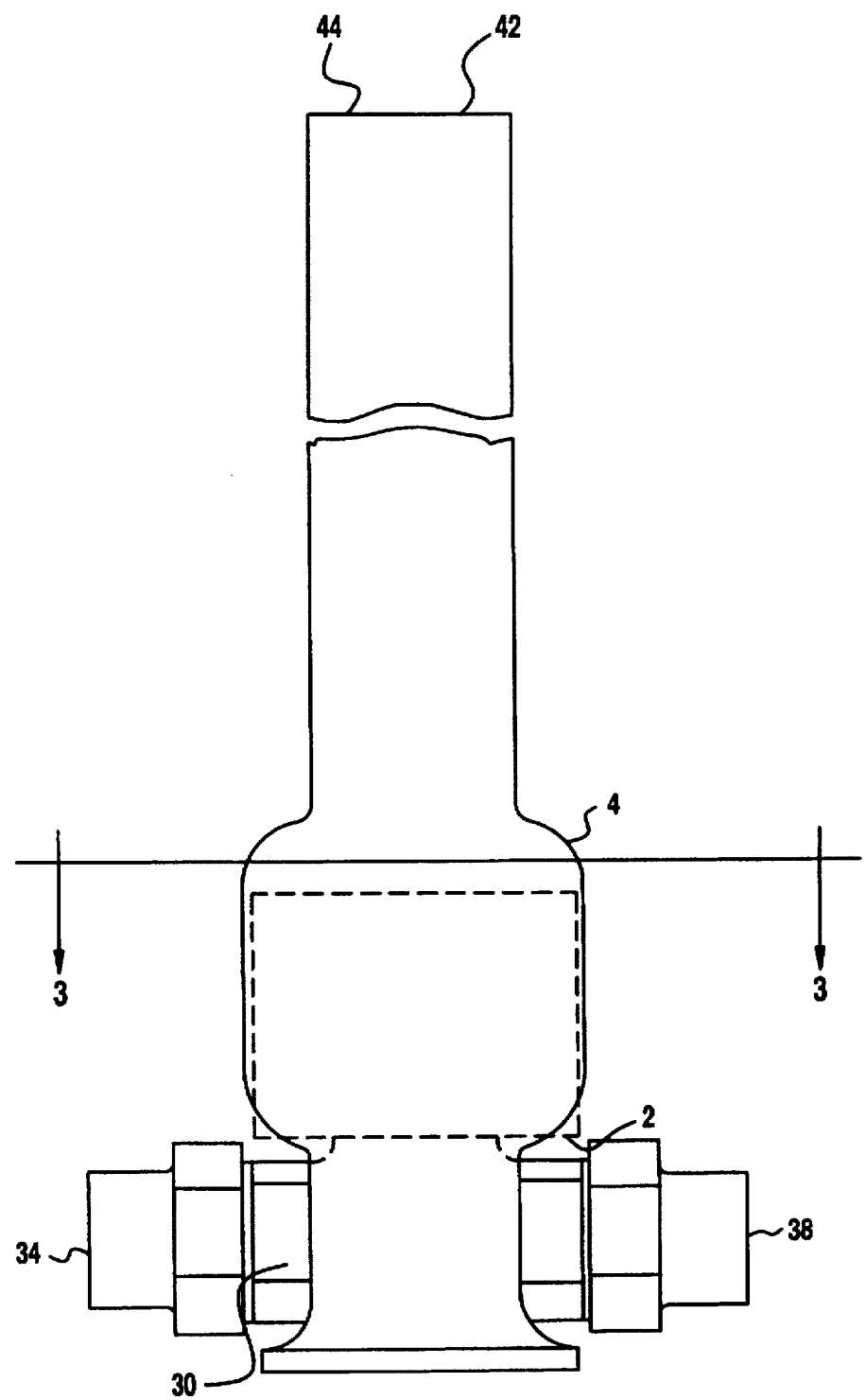
FIG. 1 is a side elevation view of a curb stop box in place over a valve assembly having a positioning member in accordance with this invention shown in broken lines secured to the neck of the valve assembly and holding the curb stop box in position.
Figure 2:
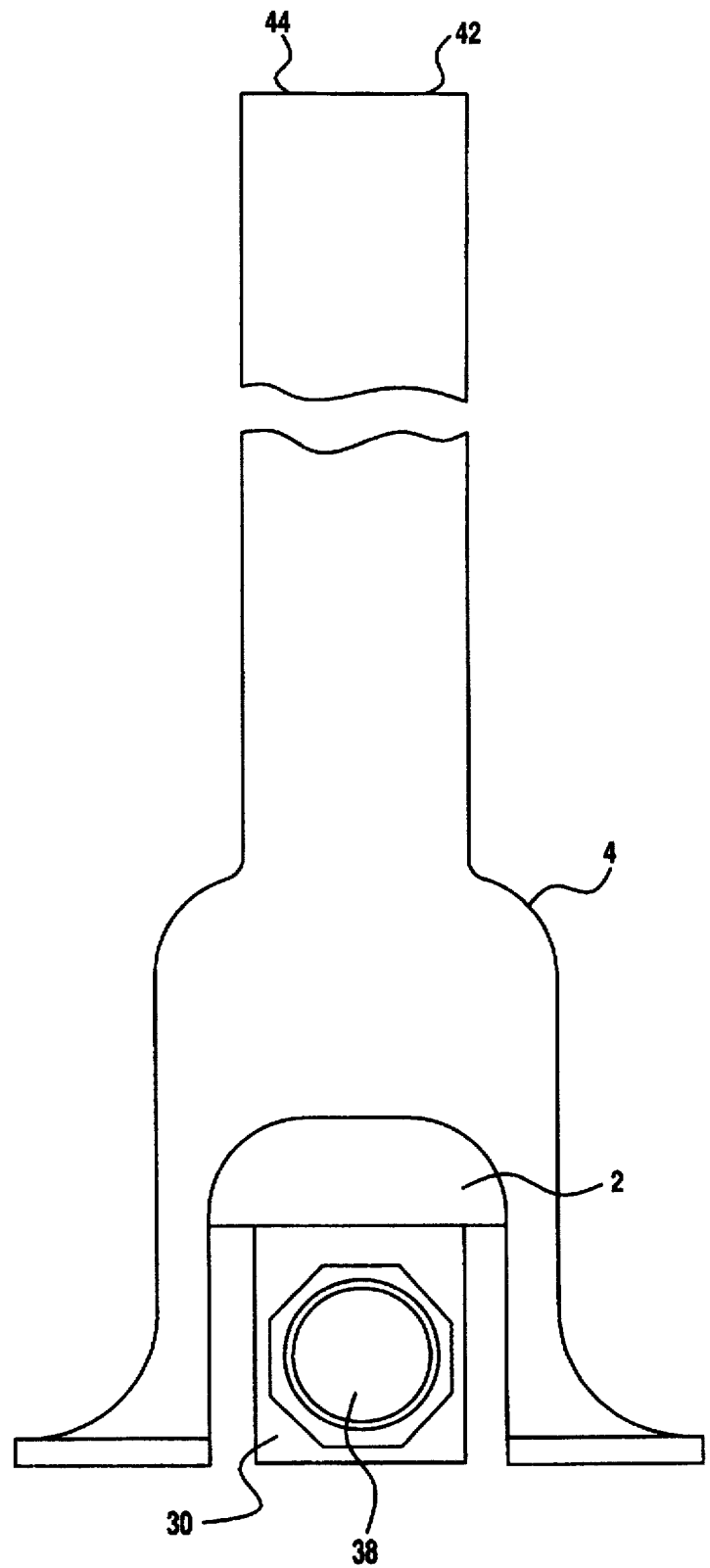
FIG. 2 is a front elevation view of the curb stop box, valve assembly and positioning member shown in FIG. 1.
Figure 3:
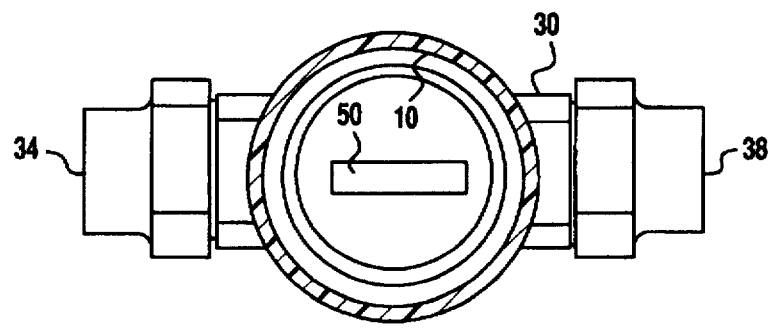
FIG. 3 is a section view taken on line 3—3 of FIG. 1.
Figure 4:
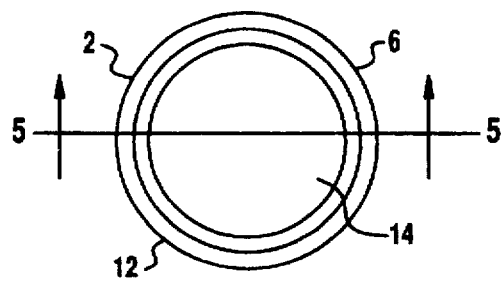
FIG. 4 is an elevation view from above of a positioning member in accordance with this invention.
Figure 5:
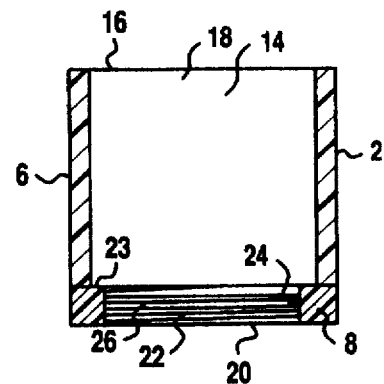
FIG. 5 is a section view taken on line 5—5 of FIG. 4.
Figure 6:
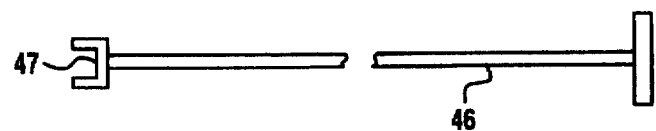
FIG. 6 is an elevation view of a shut off tool to engage and rotate the valve operating member when extended down through the bore of the curb stop box.
Figure 7:
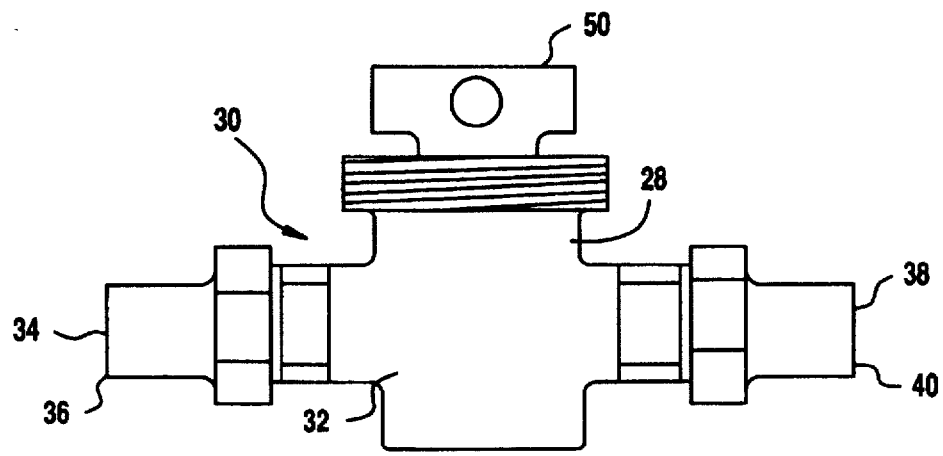
FIG. 7 is a side elevation view of a valve assembly for connecting an underground water supply line to a feeder line connected to a supply water to a residence or other facility.
Figure 8:
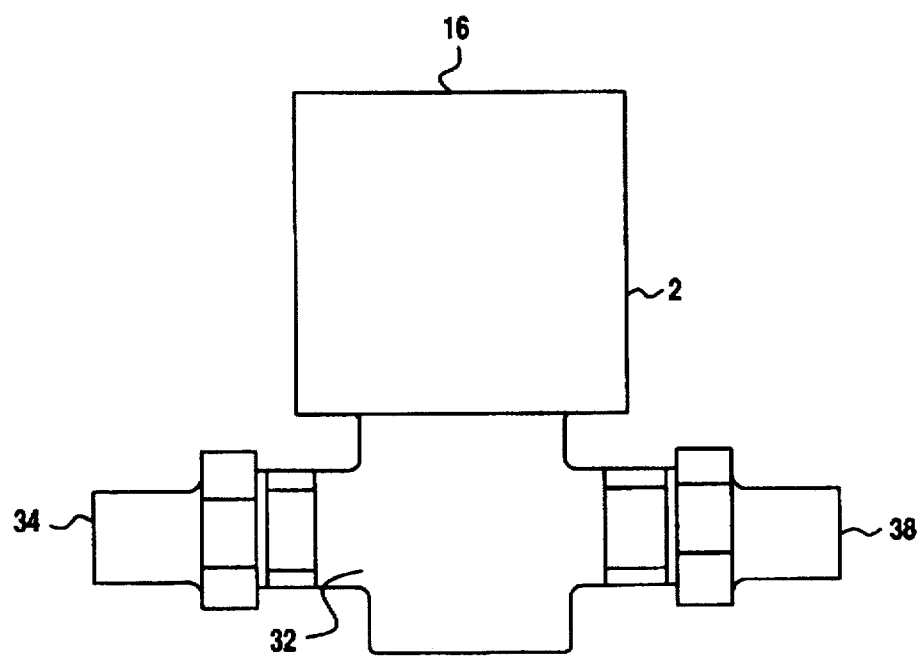
FIG. 8 is a side elevation view of the valve assembly shown in FIG. 7 with a positioning member in accordance with this invention connected thereto.

A positioning sleeve 2 for a curb stop curb box 4 comprises a cylindrical member 6 of a relatively rigid plastic material which is received in the lower end 8 of the bore 10 through the curb box 4. The dimension of the outer diameter of the cylindrical wall 12 of the positioning sleeve 2 corresponds to that of the inner diameter of the lower end 8 of the bore 10 of the curb box 4 to be received snugly therein and to hold the curb box 4 securely in place in alignment with the positioning sleeve 2.

The cylindrical member 6 includes a central bore 14 extending therethrough bounded by the cylindrical wall 12, opening at its upper end 16 to entrance aperture 18 and opening at its lower end 20 to internally threaded securing aperture 22.

The lower end 20 of the cylindrical member 6 includes an annular shoulder 23 extending radially inward from the cylindrical wall 12, the inner surface 24 of such annular shoulder bordering the said securing aperture 22 and having internal threads 26 formed on such inner surface 24. The said annular shoulder 23 extends inwardly from the said cylindrical wall 12 a pre-selected distance to provide the said internally threaded securing aperture 22 with a diameter which corresponds in dimension to that of the externally threaded neck 28 of a cut-off valve assembly 30.

The cut-off valve assembly 30 comprises a valve body 32 having an inlet port 34 opening to one side 36 and an outlet port 38 opening to its opposite side 40. In a typical installation, the inlet port 34 is connected to the water supply line of a city or other public water supply and the outlet port 38 is connected to the line leading to the building to which water is being supplied. The water supply lines and valve assembly 30 are buried in the ground below the frost line. The curb stop curb box 4 extends up to ground level from its position wherein the lower end 8 of its bore 10 is centered over the neck 28 of the valve assembly 30 and with the positioning sleeve 2 received snugly therein.

The upper end 42 of the bore 10 of the curb stop curb box 4 opens above ground level to a receiving aperture 44 for receiving an elongated shut off tool 46 therethrough, having a connecting end 48 to engage the valve operating member 50 of the cut-off valve assembly 30 for rotating between a valve open and a valve closed position.

In the absence of the positioning sleeve 2, the lower end 8 of the bore 10 of the curb box 4 would be loosely positioned over the neck 28 of the cut-off valve assembly 30. There would in such case be nothing to prevent the lower end of curb box 4 from being displaced and moved away from, out of alignment with the valve operating member 50 which extends upwardly from the center of the cylindrical neck 28, as a result of pressures which may occur from digging in the ground in the vicinity of the water lines and the cut-off valve assembly and from other causes.

When the bore 10 of the curb box 4 is moved away from and out of alignment with the valve operating member 50, it is not possible to extend the shut off tool 46 down through the bore of the curb box to engage the valve operating member 50 for closing or opening the valve.

The positioning sleeve 2 in accordance with the present invention is snugly received in the bore 10 of curb box 4 to hold it from lateral movement away from the neck 28 of the valve assembly 30 as well as to frictionally restrain the curb box 4 from upward movement relative thereto. The bore 10 of the curb box 4 is thus held in alignment with the valve operating member 50 to enable the shut off tool 46 to make engagement therewith for opening and closing the valve.

To install the positioning sleeve 2 for use, at the time the water line is extended from the main public water supply to a residence or other building, the cut-off valve assembly 30 is connected between the main supply line and the line leading to the residence or building that is to be supplied with water. At such time a positioning sleeve 2 is removably secured to the neck 28 of the cut-off valve assembly, by threaded engagement of its external threads with the internal threads 26 on the inner surface 24 of the annular flange 23 extending inwardly from the lower end 20 of the positioning sleeve's cylindrical wall 12.

It is within the scope of this invention to releasably or removably secure the positioning sleeve 2 to the cut-off valve assembly 30 by means other than threaded engagement with its said neck 28, so as to prevent both lateral and longitudinal movement of the positioning sleeve 2 relative to the valve assembly 30 when so secured thereto.

When the positioning sleeve 2 is secured to the neck 28 of the cut-off valve assembly 30, the curb stop curb box 4 is lowered to seat over the valve assembly 30 with the cylindrical wall 12 of the positioning sleeve 2 being snugly and frictionally received in the lower end 8 of the bore 10 of the curb box 4. The upper end 42 of the curb box and its bore 10 is at ground level or above when the lowered end 8 of the bore 10 has fully received the positioning sleeve therein, and the bore 10 is in alignment with the valve operating member 50. The excavation around the curb box 4, the valve assembly 30 and the underground water lines is then filled in.

I claim:

1. A positioning member for a curb stop box having an elongated tubular wall and a through passageway to hold said curb stop box in position relative to a valve assembly having a valve operating member, said positioning member including holding means engageable with said curb stop box to hold said curb stop box in a position whereby said through passageway of said curb stop box is held in alignment with said valve operating member of said valve assembly, said holding means including first holding means to hold said curb stop box against lateral movement relative to said valve assembly, second holding means to hold said positioning member against longitudinal and lateral movement relative to said valve assembly, and third holding means to hold said curb stop box against longitudinal movement relative to said valve assembly, said third holding means comprising an outer wall surface portion of said positioning member extending around the entire periphery of said positioning member, an inner wall surface portion of said curb stop box extending around the entire periphery of said through passageway thereof, said inner and outer wall surface portions being in full facing frictional contact throughout their respective facing surface areas when said positioning member is received in said through passageway of said curb stop box to thereafter frictionally hold each against movement relative to the other, said second and third holding means being laterally spaced apart, and spacing means to space said outer wall surface portion of said third holding means a pre-selected lateral distance from said second holding means for full facing frictional contact of said outer wall surface portion with said inner wall surface portion of said curb stop box when said positioning member is received in said through passageway of said curb stop box.

2. A positioning member for a curb stop box as set forth in claim 1, wherein said positioning member comprises a cylindrical sleeve having an elongated cylindrical side wall extending from a first end to an opposite second end, a sleeve passageway extending through said cylindrical sleeve opening to a first sleeve opening at said first end and to a second sleeve opening at said second end, said first end of said cylindrical sleeve being held adjacent to said valve assembly, said second end of said cylindrical sleeve being received in said through passageway of said curb stop box.

3. A positioning member for a curb stop box in combination with a curb stop box and a valve assembly as set forth in claim 2, wherein said curb stop box includes a cylindrical through passageway having an internal diameter of a first dimension, said first holding means of said positioning member comprising said elongated cylindrical side wall thereof when received in said through passageway of said curb stop box, said cylindrical side wall having an outer diameter of a second dimension sufficient to contact and bear against the inner surface of said curb stop box facing and surrounding said through passageway thereof to hold said curb stop box against lateral movement relative to said valve assembly.

4. A positioning member for a curb stop box in combination with a curb stop box and a valve assembly as set forth in claim 3, wherein said third holding means of said positioning member comprises said elongated cylindrical side wall thereof when received in said through passageway of said curb stop box, said cylindrical side wall having an outer diameter of a third dimension substantially equal to said first dimension of said internal diameter of said through passageway of said curb stop box for reception therein of said cylindrical wall of said positioning member for a snug frictional fit to thereby frictionally hold said curb stop box against longitudinal movement relative to said valve assembly, said outer wall surface portion of said positioning member being a portion of said cylindrical side wall of said positioning member.

5. A positioning member for a curb stop box in combination with a curb stop box and a valve assembly as set forth in claim 3, wherein said second holding means includes inter-engaging connecting means to hold said positioning member to said valve assembly and against longitudinal and lateral movement relative thereto.

6. A positioning member for a curb stop box in combination with a curb stop box and a valve assembly as set forth in claim 5, wherein said inter-engaging connecting means includes external threads on a one of said positioning member and said valve assembly and internal threads on the other one thereof in threaded engagement.

7. A positioning member for a curb stop box in combination with a curb stop box and a valve assembly as set forth in claim 2, wherein said valve assembly includes a cylindrical neck extending radially outwardly from and around said valve operating member, said cylindrical neck of said valve assembly having external threads therearound, said second holding means of said positioning member comprising internal threads around an inner surface portion of said cylindrical wall of said cylindrical sleeve extending inwardly from said first end thereof, said valve operating member being received through said first sleeve opening into said sleeve passageway and said internal threads of said positioning member being threadedly engaged with said external threads of said cylindrical neck of said value assembly.

8. A positioning member as set forth in claim 7, wherein said cylindrical sleeve includes an annular shoulder extending radially inwardly from the internal surface of said cylindrical wall thereof and inwardly of said sleeve passageway from said first sleeve opening at said first end of said cylindrical sleeve in the direction toward said second sleeve opening at said opposite second end thereof, said annular shoulder terminating at a point short of said second sleeve opening, said internal threads of said cylindrical sleeve being formed on and around the inwardly facing wall of said annular shoulder for threaded engagement with said external threads of said external threads of said cylindrical neck of said valve assembly, said spacing means comprising said annular shoulder.

9. A positioning member as set forth in claim 7, wherein said spacing means spaces said cylindrical side wall of said positioning member apart from said portion of the said inner surface portion thereof having said internal threads therearound any desired pre-selected distance whereby the outer diameter of said cylindrical side wall will be substantially equal to said internal diameter of said through passageway of said curb stop box for a snug frictional fit and snug frictional contact around the entire facing surfaces of the inner tubular wall of said curb stop box and the outer cylindrical wall of said positioning member when the internal threads facing inwardly of said cylindrical side wall are of the desired pre-selected dimension to threadedly engage the said external threads of said cylindrical neck of said valve assembly.

10. A positioning member as set forth in claim 9, wherein said spacing means comprises an annular shoulder extending radially inwardly from the inwardly facing surface of said cylindrical wall of said cylindrical sleeve, said annular shoulder having an inwardly facing cylindrical shoulder wall surface spaced apart a desired pre-selected distance from the outwardly facing surface of said cylindrical wall, said inwardly facing cylindrical shoulder wall surface having said internal threads of said cylindrical sleeve formed thereon, said inwardly facing cylindrical shoulder wall surface having a desired pre-selected dimension to threadedly engage the said external threads of said cylindrical neck of said valve assembly.

11. A positioning member as set forth in claim 2, wherein said cylindrical sleeve is made of a relatively rigid plastic material.

* * * * *

UNITED STATES PATENT AND TRADEMARK OFFICE
CERTIFICATE OF CORRECTION

PATENT NO : 5,730,180
DATED : March 24, 1998
INVENTOR(S): Wayne R. Alberico

It is certified that error appears in the above-identified patent and that said Letters Patent is hereby corrected as shown below:

Column 6, Claim 7, line 11, delete "value"

and insert - -valve- -

Signed and Sealed this

Twenty-sixth Day of May, 1998

Attest:

BRUCE LEHMAN

Attesting Officer

Commissioner of Patents and Trademarks